United States Patent [19]

Ogawa

[11] Patent Number: 5,032,777
[45] Date of Patent: * Jul. 16, 1991

[54] FEEDBACK CONTROLLER

[75] Inventor: Masaharu Ogawa, Amagasaki, Japan

[73] Assignee: Mitsubishi Denki Kabushiki Kaisha, Tokyo, Japan

[*] Notice: The portion of the term of this patent subsequent to Sep. 18, 2007 has been disclaimed.

[21] Appl. No.: 581,679

[22] Filed: Sep. 13, 1990

Related U.S. Application Data

[63] Continuation of Ser. No. 275,399, Nov. 23, 1988, Pat. No. 4,958,114.

[30] Foreign Application Priority Data

Nov. 25, 1987 [JP] Japan ............................... 62-298154

[51] Int. Cl.$^5$ ................................................ G05B 5/01
[52] U.S. Cl. .................................... 318/616; 318/615; 318/561
[58] Field of Search ................................ 318/560–639, 318/696, 434, 430; 388/820–845

[56] References Cited

U.S. PATENT DOCUMENTS

| 4,680,518 | 7/1987 | Kurakake et al. | 318/561 |
| 4,695,780 | 9/1987 | Kurakake et al. | 318/561 |
| 4,816,734 | 3/1989 | Kurakake et al. | 318/615 |

Primary Examiner—Paul Ip
Attorney, Agent, or Firm—Wolf, Greenfield & Sacks

[57] ABSTRACT

A high-performance and high-band feedback controller which provides a state observer in which an amount of state or an amount to be controlled outputted from a detector part and an amount of operation are input signals, presumes the amount to be controlled which is closer to a true value, can compensate for deviations from desired characteristics such as a mechanical resonance characteristic and a delay time characteristic in a high frequency band of an object to be controlled and a detector part by feeding back this presumed amount, and, further, can eliminate noise mixed into the detector part by setting the band of the state observer lower than a frequency of the noise mixed into the detector part.

34 Claims, 8 Drawing Sheets

FEEDBACK CONTROLLER

This application is a continuation of application Ser. No. 07/275,399, filed Nov. 23, 1988, now U.S. Pat. No. 4,958,114.

BACKGROUND OF THE INVENTION

1. Field of the Invention

The present invention relates to a feedback controller, and specifically relates to a feedback controller which compensates for a delay time characteristic and a mechanical resonance characteristic of an object to be controlled or a detecting means, and thereby can stably control an amount to be controlled.

2. Description of the Prior Art

FIG. 1 is a configuration diagram of a general feedback control system, for example, as shown on page 2 of "University Lecture, Automatic Control" issued from Maruzen Co., Ltd. (written by Masami ITO). In FIG. 1, numeral 1 designates a reference input element in which an aimed value of control is an input signal and a reference input signal r being the output signal of this reference input element 1 is given to a comparator part 2 which compares the signal r with a main feedback signal y* as described later and outputs a control deviation e. The control deviation e of the comparator part 2 is given to an adjusting part 3 determining an amount of operation based thereon, and an output signal of the adjusting part 3 is given to an operating part 4 converting it into an amount of operation u of higher power. Then, a controlling part 5 having a transfer characteristic Gc1(s) is constituted with the adjusting part 3 and the operating part 4. The amount of operation u of the controlling part 5 is given to an object to be controlled 6 which has a transfer characteristic Gp(s).Gpn(s) and outputs an amount to be controlled y. The outputted amount to be controlled y is given to a detector part 7 which has a transfer characteristic Ks Gsn(s), converts the amount to be controlled y into an electric signal and outputs the main feedback signal y*. In addition, in the object to be controlled 6 and the detector part 7, the Gpn(s) and the Gsn(s) are deviations from desired characteristics of the object to be controlled 6 or the detector part 7 respectively, representing the mechanical resonance characteristic and the delay time characteristic.

The conventional feedback control system is constituted as mentioned above, and in performing the feedback control thereof, to make the amount to be controlled y agree with the aimed value, the amount to be controlled y is detected by the detector part 7 to be fed back to the comparator part 2, and a difference from the reference input signal r being an output of the reference input element 1 is calculated by the comparator part 2, and this calculated value is the control deviation e. In the controlling part 5, the amount of operation u is outputted to the object to be controlled 6 so that the control deviation e outputted from the comparator part 2 is brought close to zero. This means that the controlling part 5 operates as a stabilizing compensator for stabilizing a feedback loop system. In this feedback control system, a round transfer characteristic (open-loop characteristic) from the control deviation e to the main feed-back signal y* is as follows:

$$Go1(s) = Gc1(s) \cdot Gp(S) Gpn(s) \cdot Ks \, Gsn(s) \quad (1)$$

The conventional feedback control system as mentioned above has problems as enumerated below.

(1) Normally, the object to be controlled 6 and the detector part 7 have always deviations from desired characteristics represented by Gpn(s) and Gsn(s) respectively in the high frequency band, and as is obvious from Equation (1), these Gpn(s) and Gsn(s) appear intact in the open-loop characteristic, therefore deteriorating the stability of the feedback control system. In general, the controlling part Gc1(s) is designed so that the gain of an open-loop characteristic Go1(s) is 0dB in a relatively low frequency band wherein the system is not affected by Gpn(s) and Gsn(s), and therefore the band of the feedback control system cannot be extended, and the system is vulnerable to outside disturbance, and the control deviation e is likely to become large.

(2) When detection noise is mixed into the detector part 7, particularly, frequency components lower than the band where the detector part 7 operates are not eliminated at all and are fed back intact to the comparator part, and therefore the operation of the control system is likely to be disturbed by this noise.

SUMMARY OF THE INVENTION

The present invention has been achieved to solve the above-described conventional art problems.

A first object of the present invention is to provide a feedback controller which comprises a state observer in which an amount of state or an amount to be controlled outputted from a detector part and an amount of operation are input signals, presumes the amount to be controlled which is closer to a true value, and compensates for undesirable transfer characteristics such as a mechanical resonance characteristic and a delay time characteristic in the high band of an object to be controlled or a detector part by feeding back this presumed amount.

A second object of the present invention is to provide a feedback controller which comprises a state observer in which the amount of state or the amount to be controlled outputted from the detector part and the amount of operation are input signals, and eliminates noise mixed into the detector part by setting the band thereof lower than a frequency of the noise mixed into the detector part.

A third object of the present invention is to provide a high-band, high-performance feedback controller by compensating for deviations and eliminating noise.

A fourth object of the present invention is to provide a feedback controller which performs stable operation all the time without the feedback control system being disturbed by a wrong feedback signal at starting operation by setting the input signal of the state observer to the state of zero when the feedback control system is not in operation.

The above and further objects and features of the invention will more fully be apparent from the following detailed description with accompanying drawings.

DESCRIPTION OF THE PREFERRED EMBODIMENTS

Figure 1:
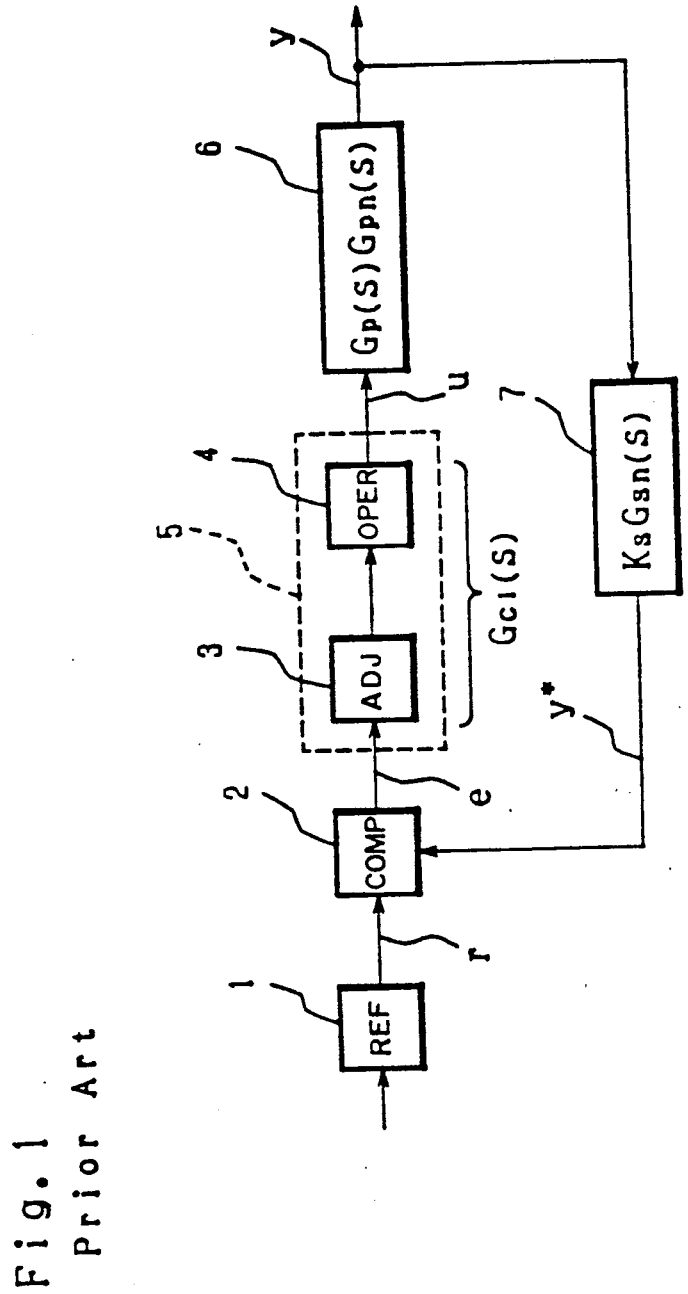
FIG. 1 is a block diagram showing a configuration of a conventional general feedback control system.
Figure 2:
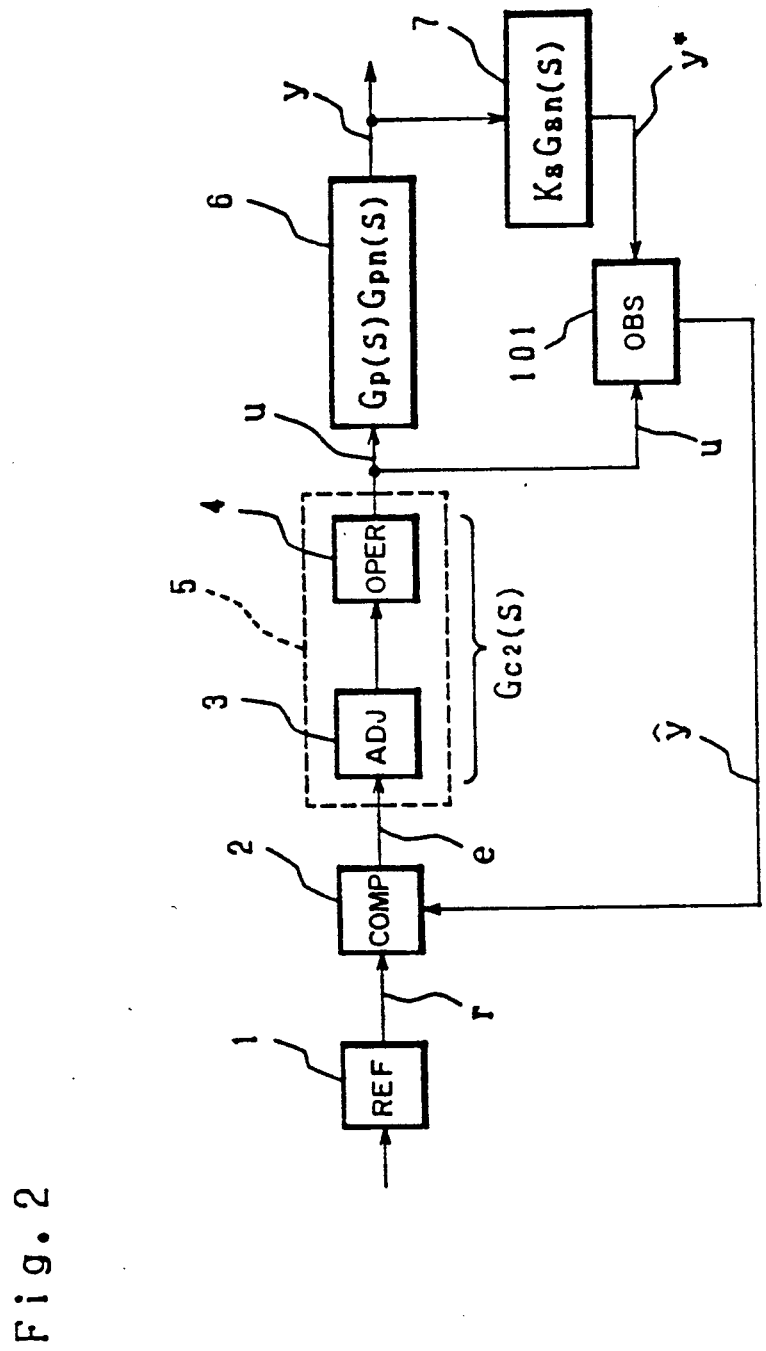
FIG. 2 is a block diagram of a feedback controller showing one embodiment in accordance with the present invention.

FIG. 2 is a block diagram showing one embodiment of a feedback controller in accordance with the present invention. In FIG. 2, numeral 1 designates a reference input element in which an aimed value of control is an input signal and a reference input signal r is an output signal, and the reference input signal r being an output signal of the reference input element 1 is given to a comparator part 2 which compares it with a presumed position signal y as described later and outputs a control deviation e. The control deviation e of the comparator part 2 is given to an adjusting part 3 determining an amount of operation based thereon, and an output signal of the adjusting part 3 is given to an operating part 4 converting it into an amount of operation u of higher power. Then, a controlling part 5 having a transfer characteristic Gc2(s) is constituted with the adjusting part 3 and the operating part 5 has a transfer characteristic Gp(s) Gpn(s), being given to an object to be controlled 6 which outputs an amount to be controlled y and a state observer 101 presuming a presumed position signal y of the amount to be controlled which is closer to a true value. The amount to be controlled y which is outputted from the object to be controlled 6 is given to a detector part 7 which has a transfer characteristic Ks Gsn(s), converts the amount to be controlled y into an electric signal and outputs a detected position signal y*. The detected position signal y* from the detector part 7 is given to the above-mentioned state observer 101.

Figure 3:
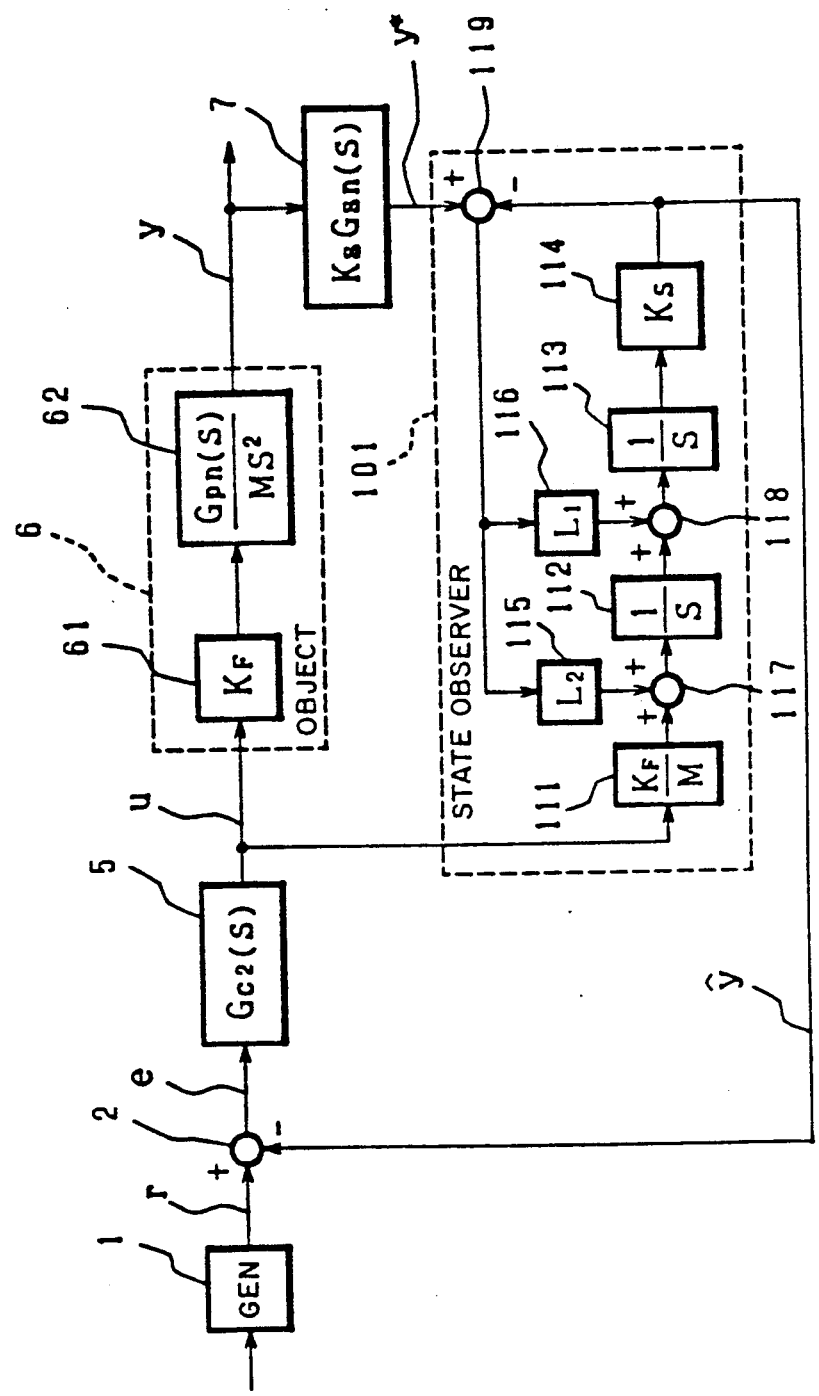
FIG. 3 is a block diagram of a position control system controlling the position of a linear motor cited as a more specific embodiment of FIG. 2.

FIG. 3 is a block diagram of a position control system controlling the position of a linear motor which is shown as a specific example of FIG. 2. In FIG. 3, numeral 1 designates an aimed position signal generator in which an aimed position is an input signal and an aimed position signal r is an output signal, and the aimed position signal r outputted from the aimed position signal generator 1 is given to the comparator 2 which compares it with a presumed position signal y as described later and outputs the control deviation e. The control deviation e outputted from the comparator part 2 is given to a pre-compensator 5 outputting a driving current u of a linear motor as the amount of operation. The driving current u outputted from the pre-compensator 5 is given to a block 6 representing the transfer characteristic of the linear motor being an object to be controlled. This block 6 includes a first block 61 which has a force constant Kf of the linear motor, is inputted the driving current u and outputs a driving power and a second block 62 which has the reciprocal of a mass M of a movable part including the linear motor and a double integral characteristic, is inputted the above-mentioned driving force and outputs the position y. The outputted position y is given to the position detector 7 detecting it with a sensitivity Ks, and it outputs a detected position signal y*. Then, the outputted detected position signal y* is given to the state observer 101, and the state observer 101 outputs the presumed position signal y.

The state observer 101 is constituted with a gain element 111 which has a value obtained by multiplying the force constant Kf of the linear motor by the reciprocal of the mass M of the movable part including the linear motor and is given the driving current u from the pre-compensator 5, an adder 117 which is given an output signal of the gain element 111 and an output signal of a feedback gain element 115 as described later and adds these signals, an integrator 112 which is given the result of addition of the adder 117, an adder 118 which is given an output signal of the integrator 112 and an output signal of a feedback gain element 116 as described later and adds these signals, an integrator 113 which is given the result of addition of the adder 118, a gain element 114 which simulates the sensitivity Ks of the position detector 7, is given the output signal of the integrator 113 and outputs the presumed position signal y, a subtractor 119 which is given the detected position signal y* of the position detector 7 and the presumed position signal y and subtracts these signals, and feedback gain elements 115 and 116 which are given the result of subtraction thereof and determine the band of the state observer 101.

Figure 4:
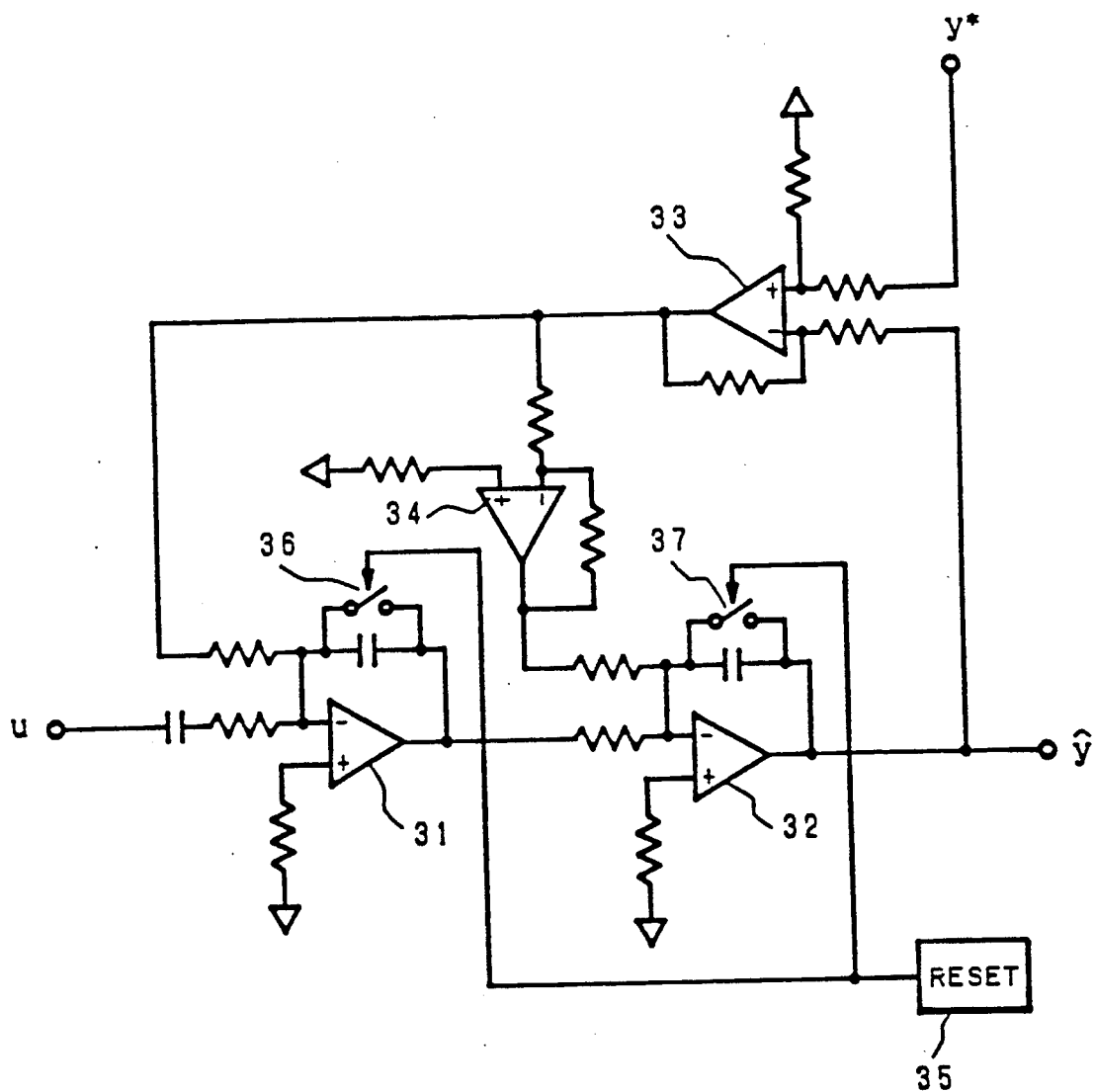
FIG. 4 is a specific circuit diagram showing part of a state observer in FIG. 3.

FIG. 4 is an example of a specific circuit diagram showing part of the state observer in FIG. 3. In FIG. 4, numeral 31 designates an operational amplifier equivalent to the gain element 111, the adder 117, the integrator 112 and the feedback gain element 115, and an output signal of the operational amplifier 31 is given to an operational amplifier 32 equivalent to the adder 118, the integrator 113, the gain element 114 and the feedback gain element 116. The presumed position signal y being an output signal of the operational amplifier 32 is outputted to the comparator 2 as the output signal of the state observer 6 and is given to an operational amplifier 33 equivalent to the subtracter 119 as well. The detected position signal y* is also given to the operational amplifier 33, and the result of subtraction of these signals is given to the operational amplifier 31 and an operational amplifier 34 inverting the polarity of the result of subtraction. An output signal of the operational amplifier 34 is given to the operational amplifier 32. Reset commands of a reset command circuit 35 which resets the respective operational amplifiers 31 and 32 by switches 36 and 37 are given separately to the operational amplifiers 31 and 32 through the switches 36 and 37.

Figure 5:
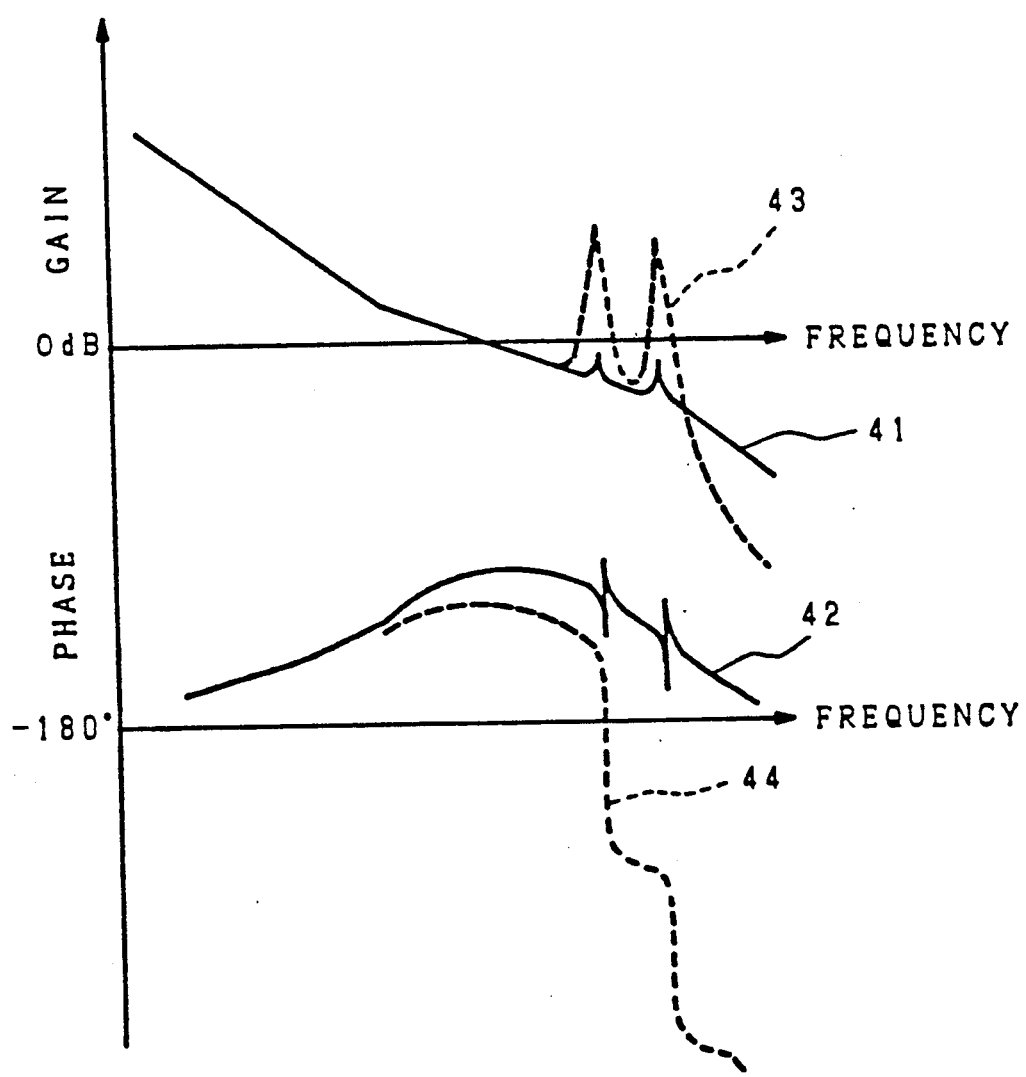
FIG. 5 is a graph of an open-loop transfer characteristic of the position control system by a linear motor for explaining an effect of the state observer in FIG. 3.

FIG. 5 is a graph of open-loop transfer characteristics of a position control system by the linear motor for explaining the effect of the state observer in FIG. 3. Full lines 41 and 42 designate respectively a gain line graph and a phase line graph of the transfer characteristic from the control deviation e to the presumed position signal y, and broken lines 43 and 44 designate respectively a gain line graph and a phase line graph of the transfer characteristic from the control deviation e to the detected position signal y*.

In the feedback controller constituted as mentioned above, if, in FIG. 2, a transfer characteristic of the controlling part 5 is Gc2(s) and the band of the state observer 101 is $\omega_{OB}$, the presumed position signal y of the amount to be controlled agrees with the detected position signal y* in case of s=jω and at frequencies ω<<ω$_{OB}$, and therefore this feedback controller makes quite the same operation as that of the conventional feedback controller. On the other hand, at a frequency ω>>ω$_{OB}$, the presumed position signal y of the amount to be controlled becomes the value obtained by inputting the amount of operation u to an electric circuit simulating the desired transfer characteristic Gp(s) of the object to be controlled 6 in the state observer 101, and is determined independent of the detected position signal y*, and therefore by designing the band ω$_{OB}$ lower than the frequencies at which deviations from the desired transfer characteristics of the object to be controlled 6 and the detector part 7 represented by Gpn(s) and Gsn(s) respectively appear remarkably, the controller is hardly affected by Gpn(s) and Gsn(s). Furthermore, out of the detection noise mixed into the detected position signal y*, frequency components ω<<ω$_{OB}$ are eliminated.

Next, further detailed description is made on the operation of a position controller of a linear motor which is a more specific embodiment as shown in FIG. 3.

First, when a driving current u equivalent to the amount of operation is inputted to the linear motor 6, a driving force equivalent to the value multiplied by the force constant K$_F$ is generated in a block 61, and the driving force is converted into an acceleration in a block 62 and then double-integrated, and is affected by a mechanical resonance characteristic Gpn(s), and thereafter the position y is determined. The position y is detected as the detected position signal y* by the position detector 7 with the sensitivity Ks.

On the other hand, the amount of operation u is inputted also to the state observer 101, becoming the presumed position signal y via the gain elements simulating the desired transfer characteristics of the object to be controlled 6 and the detector part 7 and the integrators 111 to 114.

The presumed position signal y is compared with the detected position signal y* being the other input of the state observer 101, and the presumption error thereof is added to input signals of the integrators 112 and 113 respectively through the feedback gain elements 115 and 116, and operation is performed so that the presumed position signal y converges to the detected position signal y*. The feedback gain elements 115 and 116 determine the speed of convergence of this state observer 101.

Then, an open-loop transfer characteristic Go2(s) from the control deviation e to the detected position signal y* and an open-loop transfer characteristic Go3(s) from the control deviation e to the presumed position signal y are calculated as follows:

$$Go2(s) = (Gc2(s) \cdot K_FKs/MS^2) \cdot Gpn(s) \cdot Gsn(s) \quad (2)$$

$$Go3(s) = (Gc2(s) \cdot K_FKs/MS^2) \cdot (S^2 + (L1 \cdot S + L2)Gpn(s) \cdot Gsn(s))/(S^2 + L1 \cdot S + L2) \quad (3)$$

Here, the eigenvalue of $$S^2 + L1 \cdot S + L2 = 0 \quad (4)$$

that is, the pole of the state observer 101 is disposed, for example, in a Butterworth format as follows on the complex plane.

$$L1 = \omega_{OB}^2, L2 = 2\xi\omega_{OB} \quad (5)$$

where, ξ=0.707

In Equation (3), if a frequency at which the mechanical resonance characteristic Gpn(s) has a peak is ωm, by designing with ω$_{OB}$<<ωm, the peak gain thereof can be approximated to the following equation by calculating the absolute value with S=jωm substituted into Equation (3), and thereby it is found that the mechanical resonance peak is suppressed by (1.441ω$_{OB}$/ωm).

$$(1.414\omega_{OB}/\omega m) \cdot |Gpn(j\omega m)| \quad (6)$$

Similarly, by designing ω$_{OB}$ equivalent to the band of the state observer 101 smaller than the reciprocal of delay time, a delay time characteristic Gsn(s) is also compensated by the state observer 101.

Furthermore, even if the object to be controlled 6 or the detector part 7 has a non-linear characteristic, by designing ω$_{OB}$ lower than the frequency at which this non-linear characteristic appears, the non-linear characteristic is also compensated by the state observer 101.

As described above, by designing the band ω$_{OB}$ of the state observer 101 lower, undesirable characteristics at the high frequency band of the object to be controlled 6 and the detector part 7 are replaced by desired transfer characteristics of the object to be controlled 6 and the detector part 7 which are installed in the state observer 101, and therefore the high-frequency characteristic of the open-loop transfer characteristic of the feedback control system is improved, and the cross-over frequency of the feedback control system can be designed higher.

In FIG. 5, broken lines and full lines designate gain line graphs and phase line graphs of Equations (2) and (3), respectively. The open-loop transfer characteristic in the case without the state observer 101 of Equation (2) has large peaks in the gain characteristic at the high frequency band due to the two-point mechanical resonance characteristic and the delay time characteristic, and the phase lags largely, and therefore by feeding back the detected position signal y*, the feedback control system apparently becomes unstable, but by feeding back the presumed position signal y presumed by the state observer 101, the feedback control system is stabilized. In addition, the transfer characteristic Gc2(s) of the controlling part 5 is a well-known primary phase-lead compensator.

FIG. 4 is a circuit diagram realizing the state observer 101 in FIG. 3. A difference between the detected position signal y* and the presumed position signal y* is a calculated in the operational amplifier 33, and in the operational amplifier 31, an output signal of the amplifier 33 and the AC component of the driving current u of the linear motor are multiplied respectively by gains of the feedback gain elements 115 and 111, and thereafter added and integrated. Then, an output signal of the amplifier 31 and a signal which is generated in a manner that the output signal of the operational amplifier 33 is sign-inverted by the operational amplifier 34 and is multiplied by a gain of the feedback gain element 116 are added and integrated by the operational amplifier 32, and thereby the presumed position signal y is outputted.

Normally, a constant steady load such as gravity is often applied to the object to be controlled 6, and to compensate for this load, the DC component is superposed automatically on the driving current u of the linear motor. Then, the presumed position signal y closer to the true value is obtainable by inputting only the AC component of the driving current u of the linear motor to the operational amplifier 31 without superposition of the DC presumption error on the presumed position signal y.

When the position control system is not in operation, the integrators 31 and 32 are reset by the switches 36 and 37 based on the output of the reset command outputting circuit 35 respectively, and the resetting is released simultaneously with a start of operation of the position control system, or the detected position signal y* and the driving current u of the linear motor which are two inputs of the state observer 101 are set to zero, and thereby the presumed position signal y keeps zero while the linear motor is used in a control mode other than the position control mode, and a position control operation stable all the time can be realized without the position control system being disturbed by a wrong initial value of the presumed position signal y at the instant that the position control system starts to operate.

In FIG. 4, the state observer 101 is realized by an operational amplifier, but it can be realized also by a digital circuit formed by a microprocessor or a digital signal processor.

Figure 6:
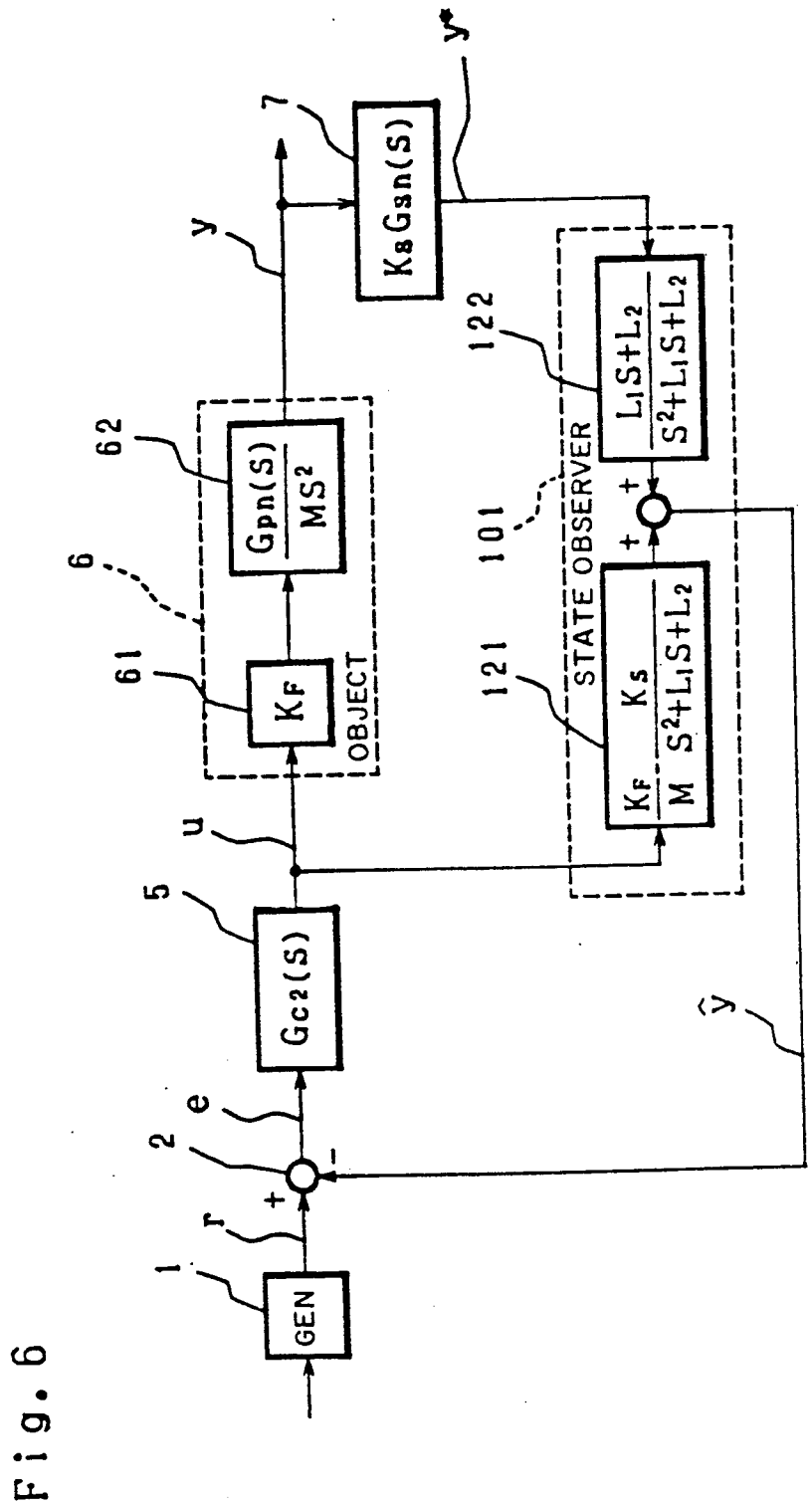
FIG. 6 is a block diagram of the position control system by the linear motor made by equivalent transformation of FIG. 3.

FIG. 6 shows a block diagram made by equivalent-transforming FIG. 3. The six blocks 111~116 in FIG. 3 are lumped into a block 121 being inputted the driving current u of the linear motor and a block 122 being inputted the detected position signal y*, and a signal generated by adding the respective outputs becomes the presumed position signal y, being fed back to the comparator part 2. The other operations and performances are quite the same as those in FIg. 3. Here, since the block 122 shows the primary integral characteristic at frequencies of $\omega_{OB}$ or higher, it is found that the state observer 101 has a function of eliminating noise mixed into the detected position signal y*.

Figure 7:
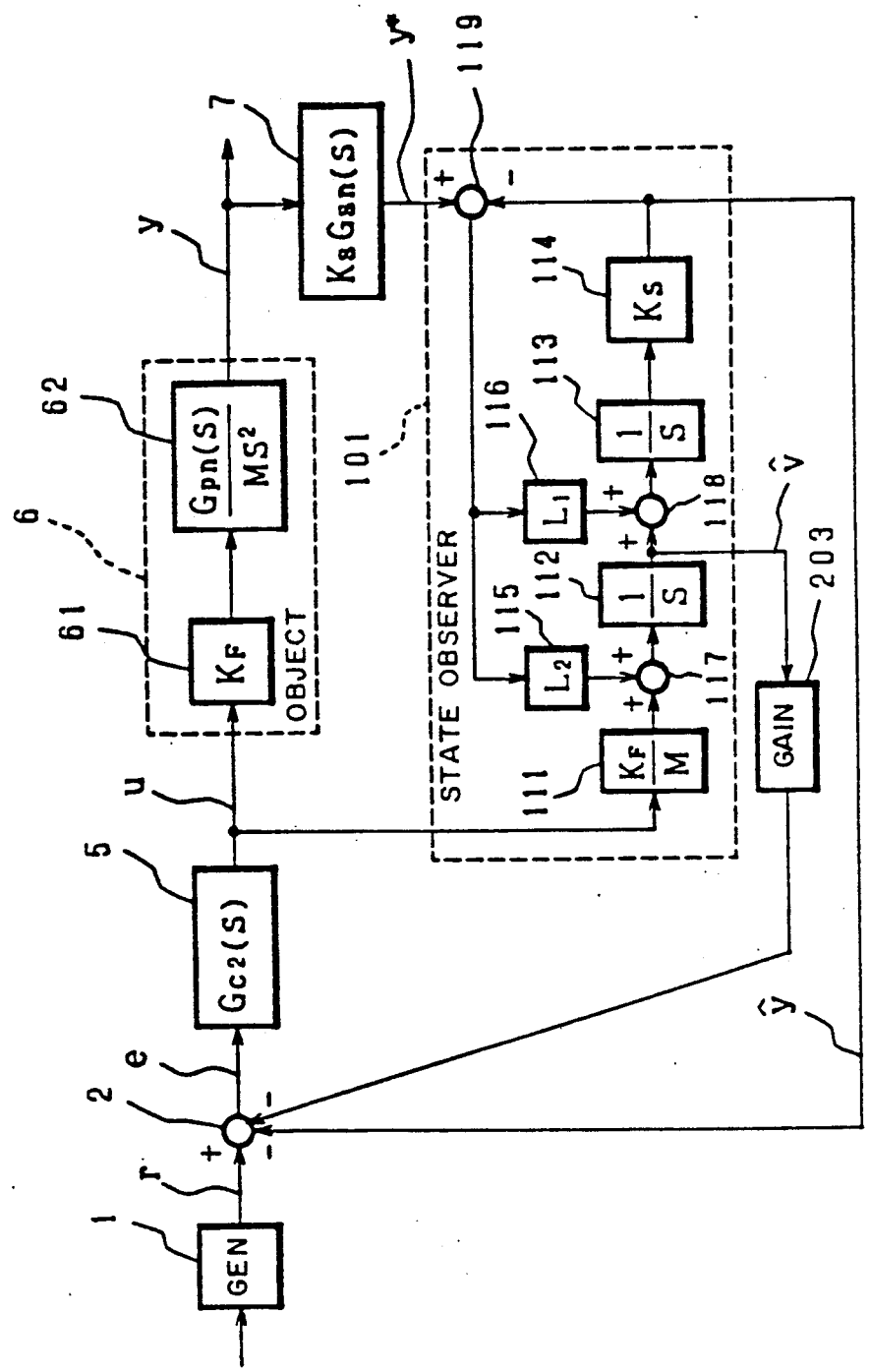
FIG. 7 is a block diagram showing another embodiment of the feedback position control system by the linear motor.

FIG. 7 shows another embodiment of the feedback position control system by the linear motor. As shown in FIG. 7, the feedback control system may be stabilized by feeding back a signal generated by passing a presumed speed signal v through a feedback gain element 203 in addition to the presumed position signal y presumed by the state observer 101. At this time, the controlling part 5 must not be always a primary phase-lead compensating element, but may be simply a gain element.

Figure 8:
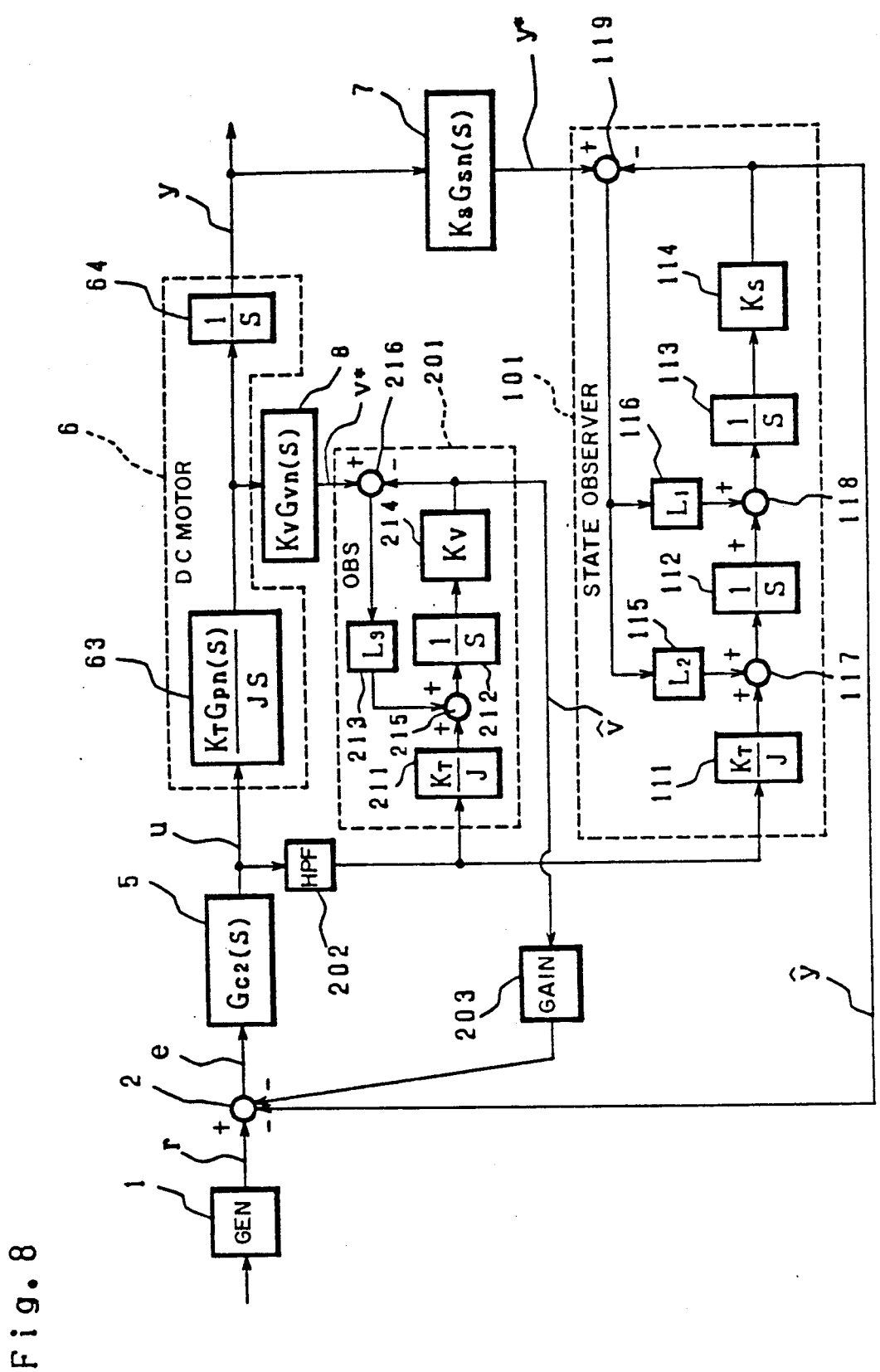
FIG. 8 is a block diagram of a rotary position control system of a DC motor which is shown as another embodiment in accordance with the present invention.

FIG. 8 is a block diagram of a rotary position control system of a DC motor which is shown as another embodiment in accordance with the present invention. When the driving current u is inputted to a DC motor 6 being an object to be controlled, in a block 63, a torque constant $K_T$ of the DC motor 6 is multiplied by the reciprocal of a moment of inertia J and integrated, and thereafter affected also by the mechanical resonance characteristic Gpn(s), and then becomes a rotary speed. It is integrated once more in a block 64 to become a rotary position.

The rotary speed being the amount of state of the DC motor 6 and the rotary position being the amount to be controlled are detected as a rotary speed signal v* and a rotary position signal y* respectively by a rotary speed detector part 8 and a rotary position detector part 7, and are inputted to a state observer 201 simulating desired characteristics of the block 63 and the rotary speed detector part 8 and the state observer 101 simulating desired characteristics of the blocks 62 and 63 and the rotary position detector part 7 respectively. To the state observers 201 and 101, the driving current u is further inputted through a high-pass filter 202, and the presumed rotary speed signal v and the presumed rotary position signal y are outputted. The presumed rotary speed signal v is fed back to the comparator part 2 along with the presumed rotary position signal y through a gain element 203, and a difference from the rotation reference input signal r becomes the control deviation e. In the controlling part 5, the driving current u of the DC motor is determined so that the control deviation e becomes as small as possible.

The state observers 201 and 101 compensate respectively for Gvn(s) and Gsn(s) which are deviations from desired transfer characteristics of the rotary speed detector part 8 and the rotary position detector part 7, and work to eliminate noise mixed into the detecting means, and it is not always necessary to provide the both state observers 201, 101 and it is also possible that either of the rotary speed signal v* being the amount of state outputted from the detector part 8 or the rotary position signal y* being the amount to be controlled outputted from the detector part 7 is presumed, and the output of the other detector part can be fed back intact.

Also, description was made by citing the linear motor and the DC motor as examples of the object to be controlled 6, but any object to be controlled is applicable if it can detect the amount of state or the amount to be controlled, for example, a plant controlling temperature.

As described above, in the present invention, the state observer is installed which inputs the output of the detecting part of the amount of state or the amount to be controlled and the amount of operation, and the amount of state or the amount to be controlled closer to the true value is presumed, and this amount is fed back, and therefore deviations from desired characteristics at the high frequency band such as the mechanical resonance characteristic and the delay time characteristic which the object to be controlled and the detecting part have can be compensated, and noise mixed into the detecting part can be eliminated. For these reasons, the band of the feedback control system can be extended and a higher-performance feedback controller can be designed.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalence of such meets and bounds thereof are therefore intended to be embraced by the claims.

What is claimed is:

1. A feedback controller comprising:
   a reference input element converting an aimed value of an amount to be controlled or an amount of state of an object to be controlled into an electrical reference input signal, wherein an amount of operation is an input signal of said object to be controlled and said amount to be controlled or said amount of state is an output signal thereof,
   a comparing means for comparing said electrical reference input signal with a feedback signal, a detecting means for detecting the amount to be controlled or the amount of state of said object to be controlled, and a state observing means being inputted said amount of operation and said detected amount to be controlled or said detected amount of state and outputting a presumed value of said amount to be controlled or said amount of state, wherein said state observing means feeds back the presumed value of said amount to be controlled or said amount of state to said comparing means, wherein said state observing means comprises gain elements and integrators simulating desired transfer characteristics of said object to be controlled and said detecting means, and feedback gain elements, and wherein the frequency band of said state observing means is set lower than a frequency at which the transfer characteristic of said object to be controlled or said detecting means deviates from said desired transfer characteristic or a frequency of detection noise mixed into said detecting means.

2. A feedback controller as set forth in claim 1, wherein said state observing means has a transfer characteristic containing no deviation from said desired transfer characteristic of said object to be controlled or said detecting means.

3. A feedback controller as set forth in claim 2, wherein said deviation is of a non-linear characteristic.

4. A feedback controller as set forth in claim 2, wherein said deviation is of a delay time characteristic.

5. A feedback controller as set forth in claim 2, wherein said deviation is of a mechanical resonance characteristic.

6. A feedback controller as set forth in claim 1, wherein said state observing means is inputted the AC component of said amount of operation.

7. A feedback controller as set forth in claim 1, wherein said integrator is set in the state of zero when the feedback control system is not in operation.

8. A feedback controller as set forth in claim 1, wherein the input signal of said state observing means is set in the state of zero when the feedback control system is not in operation.

9. A feedback controller comprising:
a reference input element converting an aimed value of an amount to be controlled or an amount of state of an object to be controlled into an electrical reference input signal, wherein an amount of operation is an input signal of said object to be controlled and said amount to be controlled or said amount of state is an output signal thereof, a comparing means for comparing said electrical reference input signal with a feedback signal, a detecting means for detecting the amount to be controlled or the amount of state of said object to be controlled, and a state observing means being inputted said amount of operation and said detected amount to be controlled or said detected amount of state and outputting a presumed value of said amount to be controlled or said amount of state, wherein the frequency band of said state observing means is set lower than a frequency at which the transfer characteristic of said object to be controlled or said detecting means deviates from a desired transfer characteristic or a frequency of detection noise mixed into said detecting means, wherein said state observing means comprises gain elements and integrators.

10. A feedback controller as set forth in claim 9 wherein said state observing means further comprises feedback gain elements.

11. A feedback controller as set forth in claim 9, wherein said state observing means has a transfer characteristic containing no deviation from said desired transfer characteristic of said object to be controlled or said detecting means.

12. A feedback controller as set forth in claim 11, wherein said deviation is of a non-linear characteristic.

13. A feedback controller as set forth in claim 11, wherein said deviation is of a delay time characteristic.

14. A feedback controller as set forth in claim 11, wherein said deviation is of a mechanical resonance characteristic.

15. A feedback controller as set forth in claim 9, wherein said state means is inputted the AC component of said amount of operation.

16. A feedback controller as set forth in claim 9, wherein said integrator is set in the state of zero when the feedback control system is not in operation.

17. A feedback controller as set forth in claim 9, wherein the input signal of said state observing means is set in the state of zero when the feedback control system is not in operation.

18. A feedback controller as set forth in claim 9, wherein said state observing means feeds back the presumed value of said amount to be controlled or said amount of state to said comparing means.

19. A feedback controller as set forth in claim 9, wherein said state observing means comprises a gain element simulating desired transfer characteristics of said object to be controlled and said detecting means and an integrator.

20. A feedback controller as set forth in claim 9, wherein said state observing means comprises a plurality of state observers coupling from said detecting means and each providing a feedback signal to said comparing means.

21. A feedback controller as set forth in claim 9, including a gain element intercoupling the state observing means and comparing means.

22. A feedback controller comprising:
a reference input element converting an aimed value of an amount to be controlled or an amount of state of an object to be controlled into an electrical reference input signal, wherein an amount of operation is an input signal of said object to be controlled and said amount to be controlled or said amount of state is an output signal thereof, a comparing means for comparing said electrical reference input signal with a feedback signal, a detecting means for detecting the amount to be controlled or the amount of state of said object to be controlled, and a state observing means being inputted said amount of operation and said detected amount to be controlled or said detected amount of state and outputting a presumed value of said amount to be controlled or said amount of state, wherein the frequency band of said state observing means is set lower than a frequency of noise mixed into said detecting means such that such noise as mixed into said detecting means is at least substantially eliminated, wherein said state observing means comprises gain elements and integrators.

23. A feedback controller as set forth in claim 22 wherein said state observing means further comprises feedback gain elements.

24. A feedback controller as set forth in claim 22, wherein said state observing means has a transfer characteristic containing no deviation from said desired transfer characteristic of said object to be controlled or said detecting means.

25. A feedback controller as set forth in claim 24, wherein said deviation is of a non-linear characteristic.

26. A feedback controller as set forth in claim 24, wherein said deviation is of a delay time characteristic.

27. A feedback controller as set forth in claim 24, wherein said deviation is of a mechanical resonance characteristic.

28. A feedback controller as set forth in claim 22, wherein said state observing means is inputted the AC component of said amount of operation.

29. A feedback controller as set forth in claim 22, wherein said integrator is set in the state of zero when the feedback control system is not in operation.

30. A feedback controller as set forth in claim 22, wherein the input signal of said state observing means is set in the state of zero when the feedback control system is not in operation.

31. A feedback controller as set forth in claim 22, wherein wherein said state observing means feeds back the presumed value of said amount to be controlled or said amount of state to said comparing means.

32. A feedback controller as set forth in claim 22, wherein said state observing means comprises a gain element simulating desired transfer characteristics of said object to be controlled and said detecting means and an integrator.

33. A feedback controller as set forth in claim 22, wherein said state observing means comprises a plurality of state observers coupling from said detecting means and each providing a feedback signal to said comparing means.

34. A feedback controller as set forth in claim 22, including a gain element intercoupling the state observing means and comparing means.

* * * * *